United States Patent [19]

Mattern et al.

[11] 4,083,049
[45] Apr. 4, 1978

[54] MOVING TARGET RADAR

[75] Inventors: John Mattern, Baltimore; Earnest R. Harrison, Glen Burnie, both of Md.

[73] Assignee: Westinghouse Electric Corporation, Pittsburgh, Pa.

[21] Appl. No.: 166,919

[22] Filed: Jul. 28, 1971

[51] Int. Cl.² ................................................ G01S 9/42
[52] U.S. Cl. ..................................................... 343/7.7
[58] Field of Search ........................ 343/5 PD, 7.7, 8, 9

[56] References Cited

U.S. PATENT DOCUMENTS 3,680,098  7/1972  Harris et al. ............................ 343/7.7

*Primary Examiner*—Stephen C. Bentley
*Attorney, Agent, or Firm*—D. Schron

[57] ABSTRACT

There is disclosed a direction-sensitive doppler radar particularly for detecting intruders into a protected area which is free of the mechanically controlled parts of the prior art. To distinguish between an intruder and the clutter produced by the movement back and forth of trees or like growth in a wind, the doppler side bands of the clutter produced by the growth moving or swaying in opposite directions are processed so that they counteract each other. The incoming signals, both clutter and from intruders, are converted into I and Q quadrature signals, frequency or sensitivity compensated and passed through a variable bandwidth bandpass filter whose bandwidth is reduced at the low-frequency end as the clutter increases. The I and Q signals are then each converted into quadrature I3 and I4 and Q3 and Q4 signals respectively, and the products I3Q4 and I4Q3 derived and subtracted. The resulting signal produces the alarm if there is an intruder and indicates the direction of movement of the intruder.

There is also disclosed a variable-bandwidth filter whose bandpass is set by time modulation of resistance of the filter. There is also disclosed a multiplier including a balanced network. One of the parameters to be multiplied is impressed as an actuating potential on the network and the other to unbalance the network for an interval dependent on the magnitude of the latter parameter.

12 Claims, 10 Drawing Figures

MOVING TARGET RADAR

BACKGROUND OF THE INVENTION

This invention relates to the moving-target radar art and has particular relationship to radar for detecting objects moving relatively slowly such as the movement of intruders into a protected area. In the use of such radar a signal having a frequency typically of the order of several hundred megacycles is transmitted into the protected area. Objects moving in the area reflect a resulting signal dependent on the movement. In effect the transmitted carrier signal is reflection phase modulated by the parameter of doppler frequency dependent on the movement of the objects. This resulting signal is received and processed to derive a signal of doppler frequency which serves to indicate the intrusion. Typically the doppler signal has a frequency of 10 cycles per second or less.

The prior art is typified by the teachings of the articles by H. P. Kalmus, *Direction Sensitive Doppler Device* in the June 1955 Proceedings of the IRE beginning page 698 and *Doppler Wave Recognition With High Clutter Rejection* Document AD 652,878 TR-1349 of Harry Diamond Laboratories, Washington, D.C., Apr. 1967. This prior art includes facilities for determining the direction of movement of a target but has the disadvantage that it is characterized by microphonics. Other typical prior art includes a balanced processor for determining the direction of movement of a target but has the disadvantage that the channels must be closely matched.

It is an object of this invention to overcome these disadvantages of the prior art and to provide a moving target radar capable of detecting a moving target in the presence of substantial clutter and determining the direction of movement of the target without the microphonics and/or the demand for matched channels of the prior art. It is another object of this invention to provide such a radar particularly suitable for the detection of objects or bodies intruding into a protected region. A further object of this invention is to provide a variable-bandwidth bandpass filter of relatively simple structure and relatively low cost. A still further object of this invention is to provide a precise multiplier for multiplying electrical parameters.

SUMMARY OF THE INVENTION

The prior art as taught by the Kalmus articles includes a mechanically operating correlator which may be an eddy-current drag disc or relatively movable coils operating on a bimorph piezoelectric strip. This invention arises from the realization that the microphonics are introduced by the mechanically operating components.

In accordance with this invention a moving target radar is provided which is fully electronic and has no moving parts. The incoming signal reflected from an object in the protected region is converted into I and Q signals. Each signal is transmitted through a variable bandpass filter whose pass band is controlled by the magnitude at the output of the filter. As the output of the filter increases the pass band is reduced by increasing the cut-off frequency at the low-frequency end of the pass band.

This mode of controlling the pass band is based on the realization that the clutter, typically produced by growth moving in the wind, is of low doppler frequency while an intruder moving into the protected region moves at a substantially higher rate than the growth and produces a signal of substantially higher doppler frequency than the clutter. Reduction of the pass band at the low-frequency end as the clutter increases thus achieves an increase in signal-plus-noise-to-noise ratio without appreciable loss in sensitivity to the presence of intruders.

The I and Q signals at the outputs of the filters are each converted into quadrature signals which may be designated as I3 and I4 and Q3 and Q4 respectively. The cross products 13Q4 and 14Q3 are then derived. The difference between 13Q4 and 14Q3 is derived and serves to indicate the presence of an intruder, if any. This difference is passed through a low-pass filter and to the intruder indicators. The effect of this is essentially to suppress the clutter because the growth moves backward and forward in the wind, and it appears in the processing in both products as equal magnitudes and is eliminated during subtraction steps. The effect of the conversion into quadrature signals I3 and I4 and Q3 and Q4 is to split the incoming signals into a signal and its derivative. The cross multiplication essentially multiplies each signal by the time-derivative of the other.

Oversimplifying for the purpose of explanation:

Let
$I = A \sin \theta$
$Q = B \cos \theta$
$\dot{I} = A \dot{\theta} \cos \theta$
$\dot{Q} = -B \dot{\theta} \sin \theta$
$I\dot{Q} = -AB \dot{\theta} \sin^2 \theta$
$Q\dot{I} = AB \dot{\theta} \cos^2 \theta$
$I\dot{Q} - Q\dot{I} = AB \dot{\theta} (\sin^2 \theta + \cos^2 \theta) = AB \dot{\theta}$
If $\theta = \omega \, dt$ where
$\omega \, dt$ is the doppler frequency
$t$ is time
$\dot{\theta} = \omega dt$
$\int AB \dot{\theta} \, dt = \theta = \omega \, dt$
If $\omega \, dt$ is alternately positive and negative,
$\theta = 0$ The effect of the low-pass filter at the output is thus to suppress the clutter.

The cross multiplication involves in each case a signal derived from the I channel and a signal derived from the Q channel. It is then not necessary to match the components of the channels.

in accordance with this invention a variable bandpass filter is provided in which the pass band is set by the duty cycle in the filter network of a selected one of the frequency determining components of the filter. Typically the filter is of the resistance-capacitance type and the pass band is determined by the duty cycle of conduction through the resistance. Where the pass band is varied at the low-frequency end an increase in the duty cycle of conduction decreases the pass band and a decrease in the duty cycle of conduction increases the pass band.

in accordance with this invention apparatus is provided for multiplying electrical parameters, typically voltages, which includes a balanced network. One of the parameters to be multiplied is impressed to activate the network; the other is impressed to unbalance the network for a time interval proportional to this latter parameter. The product derived from the network is the product of the activating magnitude by the time of the unbalance.

Briefly stated the following are some of the advantages of the invention:

1. It performs the detecting functions by all electronic means; thus, microphonics peculiar to the Kalmus filter for example are avoided.
2. It achieves the results of the balanced processor without closely matched channels.
3. It achieves the results of the balanced processor with fewer components.
4. It achieves the cross-multiplication in a simple and precise manner with a pair of precision on-off bridge multipliers.
5. it achieves the required bandwidth control in a simple manner with on-off control of the RC filter time constants.
6. Its operation can readily be adapted to a particular type of target by changing time constants in the low-pass output filter.
7. It includes an "all pass" type of 90° phase difference circuit having phase characteristics superior to the Dome filter; amplitude variations are compensated at a point where the associated phase characteristics are unimportant.
8. It is blind to in-phase signal components and therefore fails safe due to signal components which are not in quadrature.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIGS. 8A and 8B are presented for the purpose of aiding those skilled in the art in practicing this invention and not with any intention of in any way limiting this invention.

DETAILED DESCRIPTION OF INVENTION

Figure 1:
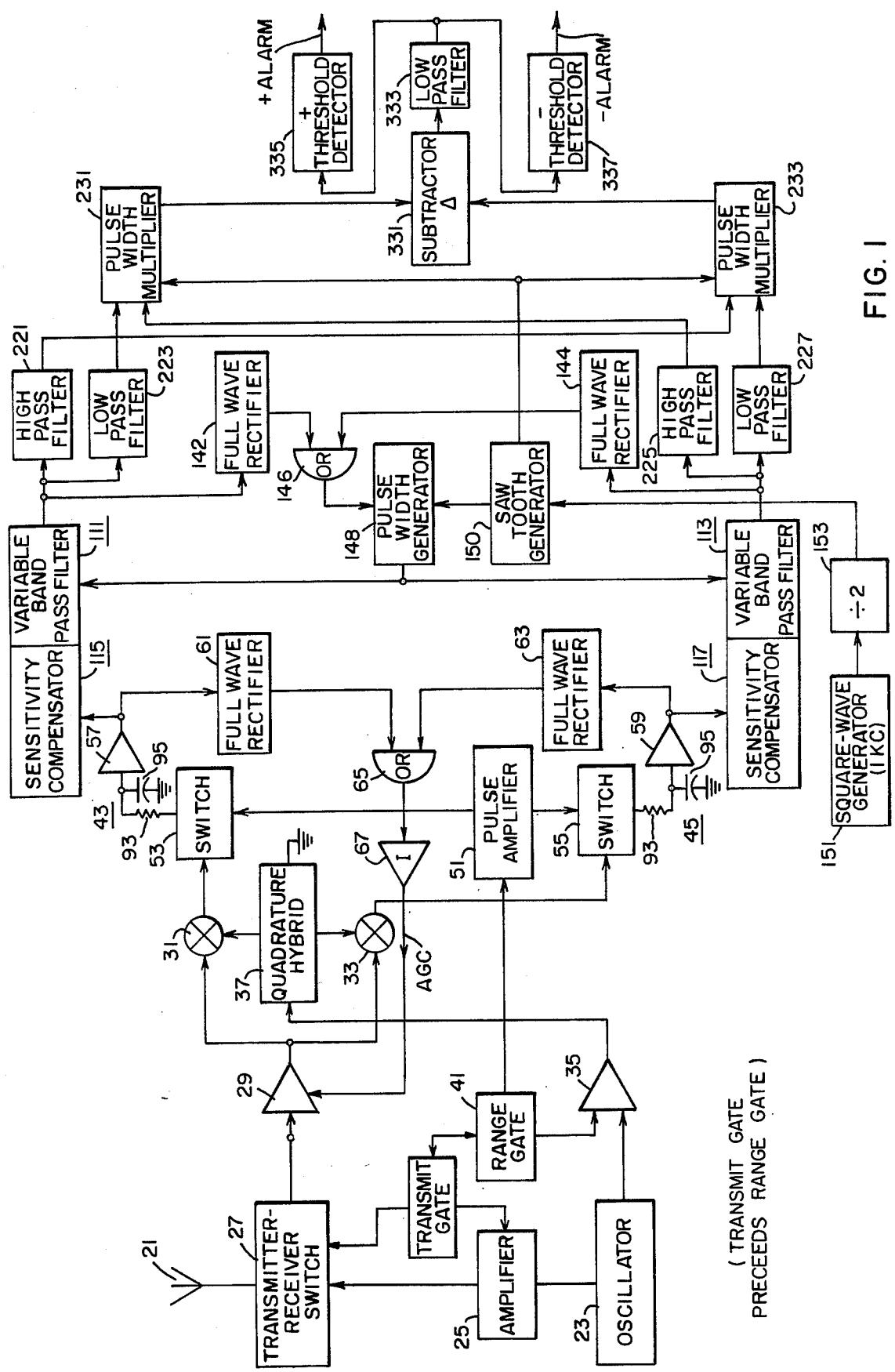
FIG. 1 is a block diagram showing apparatus in accordance with this invention.

The apparatus shown in FIG. 1 is a radar including a common antenna 21 for transmitting and receiving. There is also an oscillator 23. The transmitted signal is derived from the oscillator 23 through an amplifier 25 and a transmitter-receiver switch 27. The received signal passes from the switch 27 through a low level radio-frequency amplifier 29 to mixers 31 and 33. The oscillator 23 is connected to the mixers 31 and 33 through a receiver gate 35 and through a quadrature hybrid 37. At the outputs of the mixers 31 and 33 quadrature signals I and Q of the doppler frequency are produced at the sampling rate of the range gate 41 and these signals are transmitted through the I and Q channels 43 and 45. The receiver gate 35 operates in synchronism with the range gate 41.

From this point the apparatus shown in FIG. 1 may be described as a homodyne multiplication processor. The range gate 41 defines the range interval over which the radar apparatus is responsive and limits the extent of the clutter with which the signal must compete. Beyond the range gate switch the pulse spectrum is lost, leaving only the translated carrier (dc) and the folded clutter and signal spectra having very narrow bandwidths. There may be several range gates 41 each defining a different range. Separate I and Q channels 43 and 45 are associated with each range gate 41. The channels 43 and 45 may be referred to as a homodyne processor.

The range gate 41 operates through a pulse amplifier 51 which opens switch 53 and 55 in the I and Q channels 43 and 45. The output of each switch 53 and 55 is supplied to the input of a low-noise amplifier 57 and 59. The outputs of the amplifiers 57 and 59 in addition to supplying the receiver signals through channels 43 and 45, supply essentially unfiltered clutter side-bands for automatic gain-control (AGC) thus assuring level control of the full clutter spectrum. For this purpose each channel 43 and 45 may be represented in the block diagram, FIG. 1, as including full-wave rectifiers 61 and 63 connected to the output of the corresponding amplifier 57 and 59 respectively. The rectifiers 61 and 63 are represented as supplying through an OR network 65, integration amplifier 67 which is connected to the AGC input of the low-level amplifier 29 to control the gain. The AGC limits the excessive dynamic range to which the mixers 31 and 33 would otherwise be subjected. The AGC thus improves the ability of the homodyne processor according to this invention to cope with different clutter environments.

Figure 2A:
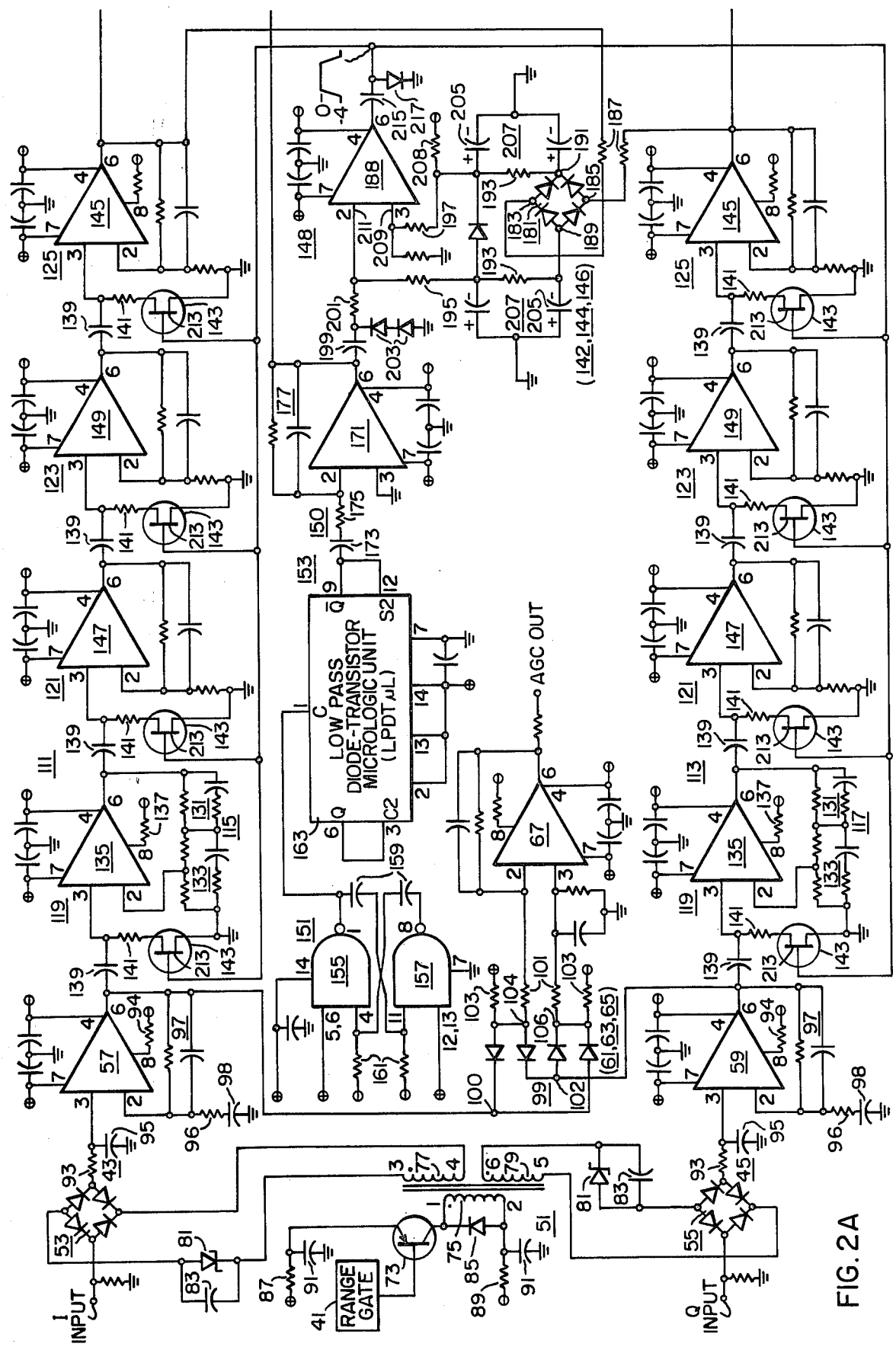
FIGS. 2A and 2B together constitute a schematic of this invention.

As shown in FIG. 2A, the switches 53 and 55 are essentially diode networks with the diodes 71 poled to conduct when the gating pulses is "ON". The pulse generator 51 includes a transistor 73 in whose emitter-collector circuit the primary 75 of a pulse transformer is connected. The secondaries 77 and 79 of the transformer are connected each to a corresponding switch 53 and 55 respectively through a Zener diode 81 shunted by a capacitor 83. The gating signal is impressed on the base of the transistor 73. The primary 75 is shunted by a diode 85 which suppresses oscillation. The transistor 73 is supplied with potential through resistors 87 and 89 by-passed to ground through capacitors 91. Each amplifier 57 and 59 is a high-gain operational amplifier. The output of each switch 53 and 55 is connected to the positive input of the corresponding amplifier 57 and 59 through a hold network including a resistor 93 and a capacitor 95. The network 93-95 operates to integrate the sample signals that are received while the gate 41 is closed. A network 97 is connected between the output and the negative input of each amplifier 57 and 59. Each negative input is also coupled to ground through a resistor 96 and a capacitor 98. Each amplifier 57 and 59 operates as a voltage follower with gain at higher frequencies when the capacitor 98 conducts, but at no gain at dc when the capacitor 98 is nonconducting. The networks 97 and 96–98 shape the frequency response of the amplifiers 57 and 59. The amplifiers 57 and 59 are each operated with low bias current which is set by R94 which controls the quiescent current. The lower the quiescent current, i.e. the higher the resistor 94, the lower the input bias current at which the amplifier operates. The resistor 94 is selected to set the input bias current and noise of the amplifier to best achieve its purpose. The rectifiers 61 and 63 (FIG. 1) and the OR network 65 are combined into a common full-wave rectifier bridge 99 (FIG. 2A) whose input terminals 100 and 102 are supplied respectively from the amplifiers 57 and 59 and whose output terminals 104 and 106 supply the negative and positive inputs of the integration amplifier 67 through resistors 101. The rectifier is back biased through the resistor 103 to set the level of the signals which pass through the network 99.

The output of each amplifier 57 and 59 is passed through a multistage bandpass filter 111 and 113 of variable bandwidth. The input stage of each filter 111 and 113 includes a sensitivity or frequency-compensation network 115 and 117.

The sensitivity compensator 115, 117 accomplishes a function which is relegated to the Dome filter in prior art apparatus, allowing the phasing to be accomplished simply with great precision but with non-uniform gain. Each of the stages of the filter 111, 113 has a variable low frequency cut-off and a fixed high frequency roll-off.

As shown in FIG. 2 each filter 111, 113 has four stages 119, 121, 123, 125 (there may be more or less). Each first stage 119 includes the sensitivity or frequency compensation network 115, 117. This network includes a plurality of resistor capacitor networks 131 and 133 connected between the output and the negative input. The positive input terminal of each first stage 119 is supplied from the output of the associated amplifier 57 or 59 through a filter including a capacitor 139 and a resistor 141, the resistor being connected to ground through a field-effect transistor (FET) 143.

The other stages include high-gain operational amplifiers 147 and 149 and 145. Each stage of the filters 111, 113 is connected to the next stage through a network similar to the input to the first stage 119 including a capacitor 139 and a resistor 141 connected to ground through a field-effect transistor 143.

The choice of 4-pole filters 111, 113 was in the specific case which serves for the embodiment described in detail, dictated by the clutter spectrum characteristic. It was found that the clutter spectrum, in the case disclosed, rolls off at a rate of 24 dB/octave. A 4-pole high pass characteristic then renders the clutter spectrum essentially flat. Such a spectrum can be readily managed by an automated bandwidth control as disclosed. Control of the low frequency cut-off is by "time" modulation of the resistance in the RC coupling between stages. The actual control waveform is a sequence of pulses of variable width which opens and closes a switch in series with the resistance 141. The effective resistance is R times the switching duty cycle where R is the resistance 141.

Signals used to control the variable bandwidth are derived from the clutter spilling over into the pass band of the filters 111 and 113. The regulation acts to keep the peak level of these signals within the dynamic range of the final amplifiers 145 in the filters. The output of the filters 111 and 113 is passed through full-wave rectifiers 142 and 144 (FIG. 1) and through an OR network 146 into a pulse width modulator 148. The modulator is supplied with waves of triangular waveform, typically at 500 cycles of pulse repetition rate per second, derived from a sawtooth generator 150. The generator is energized from a squarewave generator 151 operating at 1 kilocycle per second through a divider 153. The frequency of 500 cycles per second is high compared to the doppler frequency of the signals in the channels 43 and 45 which extend from a fraction of a cycle per second to about 10 cycles per second. The waves of triangular waveform are shifted in a more positive or a more negative direction by the modulator 148, depending on the output of the OR network 146, and are flattened. A train of flat waves are thus produced, each wave rising from a negative base, typically −4 volts to zero, and having a zero interval depending on the magnitude of the clutter at the output of the filters 111 and 113. The pulse causes the field-effect transistors 143 to conduct during the zero intervals setting the duty cycles of resistors 141. An increase in the clutter at the output of the filters cause the pulse-width modulator 148 to produce a wider pulse which in turn causes the return resistors 141 in the coupling network to be "on" for a longer time thus decreasing the effective resistance and raising the corner frequency of the filter. The pulse repetition rate is in the specific case disclosed set at 500 Hz, because this frequency is high enough to eliminate granularity in the waveforms emerging from the filters 111 and 113. The response time of the control is limited by loop stability considerations to approximately 30 seconds. For other purposes substantially higher or lower repetition rates are used.

As shown in FIG. 2A, the square wave generator 151 includes a pair of low-power diode-transistor micrologic units 155 and 157 cross connected through appropriate capacitors 159 and energized through appropriate resistors 161 to produce the one kilocycle per second repetition rate square waves. The reduction to 500 cycles per second is effected by a low-power diode-transistor micrologic unit 163.

The sawtooth generator 150 includes the high gain operational amplifier 171 whose negative input is supplied from the divider 153 through an integration network including capacitor 173 and resistor 175. The positive input of the amplifier 171 is grounded and its gain is controlled by a feedback network 177 to the negative input.

As shown in FIG. 2A the rectifiers 142 and 144 and the OR 146 are combined into a rectifier bridge network 181. The input terminals 183 and 185 of the bridge 181 are respectively connected to the outputs of the filters 111 and 113 through resistors 187. The pulse width modulator 148 includes a high-gain operational amplifier 188 to whose positive and negative inputs 209 and 211 the output terminals 189 and 191 of the bridge are connected through resistors 193 and 195 and 193 and 197. The output of amplifier 171 is connected to the negative input of amplifier 188 through a capacitor 199 and a resistor 201. The sawtooth passed by capacitor 199 is prevented from going negative by rectifiers 203 to ground. The pulses from amplifier 171 charge the capacitors 205 of a "dual input" rectifier 207 which is connected across resistors 193, through resistor 195 and biased by voltage impressed through a resistor 208. The outputs from the filters 111 and 113 operate in push-pull through the bridge 181 to overcome the bias and impress the voltages from the rectifiers on the positive and negative inputs 209 and 211 respectively of the amplifier 188 thus shaping the output of this amplifier 188. The output of the amplifier 188 is impressed as trains of negative going pulses on the bases 213 of the field-effect transistors 143 through capacitor 215. The pulses are prevented from going positive by rectifier 217. The field-effect transistors 143 are conducting during the intervals when each pulse is zero and this determines the duty cycle of the resistors 141 and the lower cut-off frequency of the filters 111 and 113.

The filtered clutter and doppler I and Q signals are now each processed by a pair of 90° phase difference circuits 221 and 223 and 225 and 227 (FIG. 1). These circuits accurately maintain their phase difference from 0 Hz to an upper limit established only by parasitic effects. Each phase-difference circuit consists of a low-pass RC filter 223 and 227 and a high-pass RC filter 221 and 225 with coincident poles. The quadrature signals derived from the I signal may be called I3 and I4 and that from the Q signal Q3 and Q4. The outputs of the phase-difference circuits are cross coupled to a pair of 4 quadrant precision multipliers 231 and 233. The multiplier uses a pulse width principle wherein one analog input time modulates the balance of a bridge 235 and 237 (FIG. 2B) while the other input activates the bridge. With no input to the pulse width modulator the bridge is unbalanced exactly half the time in the right direction and exactly half the time in the left direction. Any signal at the other input therefore produces no average output. Likewise if the bridge is unbalanced but is not activated there is also no output. The multiplier is implemented using bipolar switches without adjustments of any kind. Accuracy is maintained by use of 0.1% tolerance resistors. The pulse repetition rate is 500 Hz.

Figure 2B:
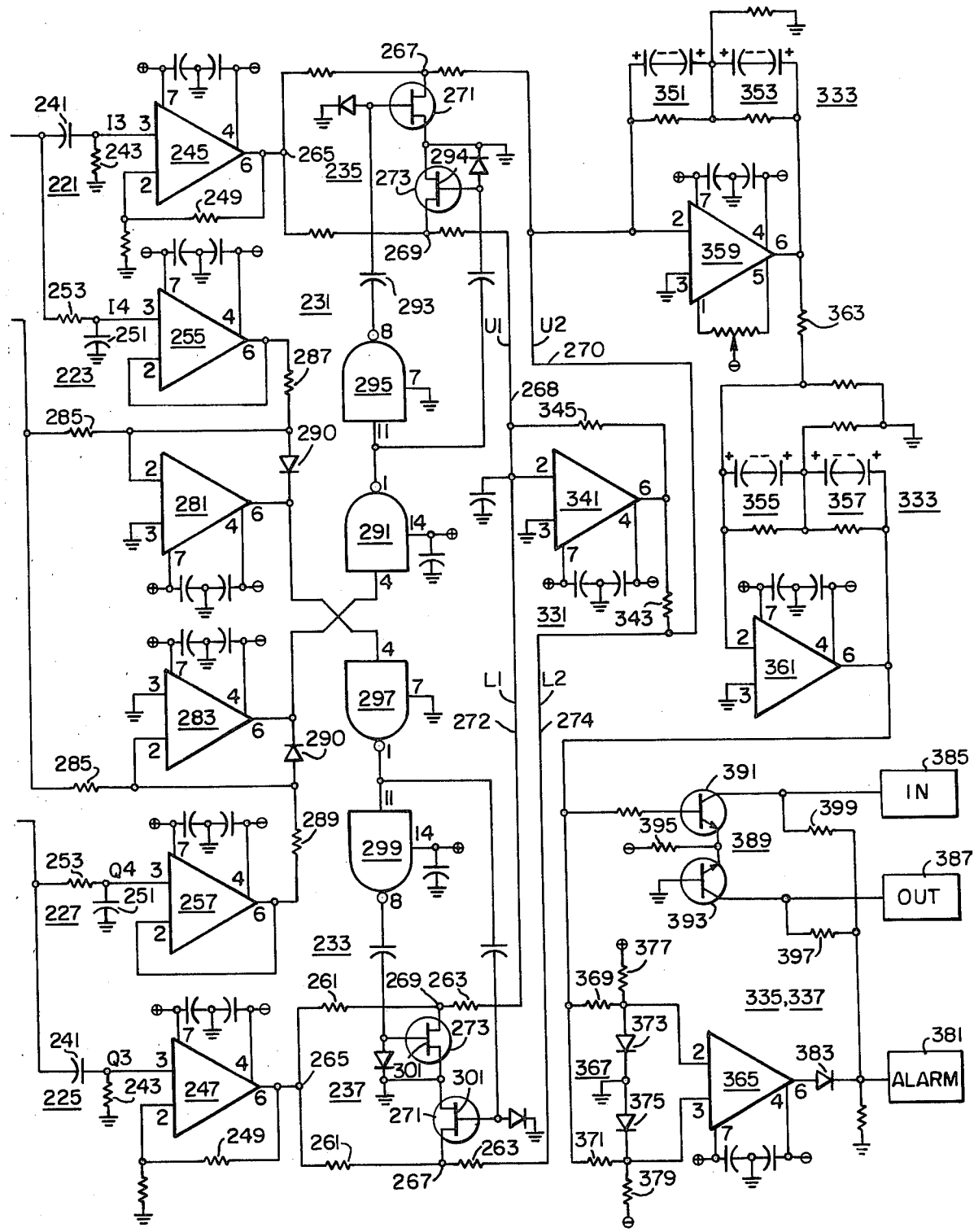

As shown in FIG. 2B each high-pass filter 221 and 225 includes a capacitor 241 and a resistor 243. The output of the four stage filters 111 and 113 are impressed on the positive input of a high-gain operational amplifier 245 and 247 respectively through the capacitor 241. Each amplifier 245, 247 is connected as a voltage follower with gain, the gain being set by a resistor 249 between the output and the negative input. The low pass filters also each include a capacitor 251 and a resistor 253. The outputs of the four-stage filters 111 and 113 are impressed on the positive inputs of high-gain operational amplifiers 255 and 257 through the resistors 253. The amplifiers 255 and 257 are connected as no-gain (gain of one) amplifiers.

Each bridge 235 and 237 includes pairs of equal resistors 261 and 263 connected to produce a balanced output. The outputs of amplifiers 245 and 247 are connected respectively to an activating terminal 265 of a bridge 235 and 237. Between each of the other terminals 267 and 269 and ground, field effect transistors 271 and 273 are connected. The output of each bridge 235 and 237 is derived from terminals 267 and 269 through conductors 268 and 270 and 272 and 274, respectively. Each bridge 235, 237 is balanced and remains balanced when the field-effect transistors 271, 273 are nonconducting or conduct for equal intervals and becomes unbalanced when these transistors conduct for unequal intervals. When a bridge 235, 237 is balanced or when no activating potential is impressed from the amplifiers 245 and 247 the output of the bridge is zero; when a bridge is unbalanced a potential proportional to the product of the activating potential by the time of unbalance is produced. The polarity of this product potential depends on the direction of unbalance; that is, on which transistors 271, 273 conducts for the longer time and which for the shorter time.

The conduction of the transistors 271 and 273 is timed by square wave pulses. Pulses of triangular waveform and of a repetition rate typically of 500 per second derived from sawtooth generator 150 (FIG. 2A) are impressed on the negative inputs of high-gain operational amplifiers 281 and 283 through resistors 285. The output of amplifier 255 is superimposed on the triangular wave in the input of amplifier 281 through a resistor 287 and the output of amplifier 257 on the triangular wave in the input of amplifier 283 through resistor 289. Each amplifier 281 and 283 includes a feedback network in which there is a rectifier 290 to prevent the output of the amplifier from going negative to a substantial or appreciable extent. The potential derived from the amplifiers 255 and 257 is of substantially lower frequency than the triangular waveform potential. The output of amplifier 283 which is essentially the triangular waveform modulated by the signal Q4 is impressed on low-power diode-transistor micrologic 291 which operates as an inverter. This unit is connected through a capacitor 293 to the base 294 of field-effect transistor 273 of bridge 235. The output of micrologic 291 is also inverted through low-power diode-transistor micrologic 295. The output of the latter is impressed on the base 294 of transistor 271. The signals impressed on the bases 294 are square wave signals whose duration is dependent on the modulated triangular wave signals. Likewise the output of amplifier 281 is impressed through low-power diode-transistor micrologic 297 and 299 on the bases 301 of transistors 271 and 273 of bridge 237.

Figure 3:
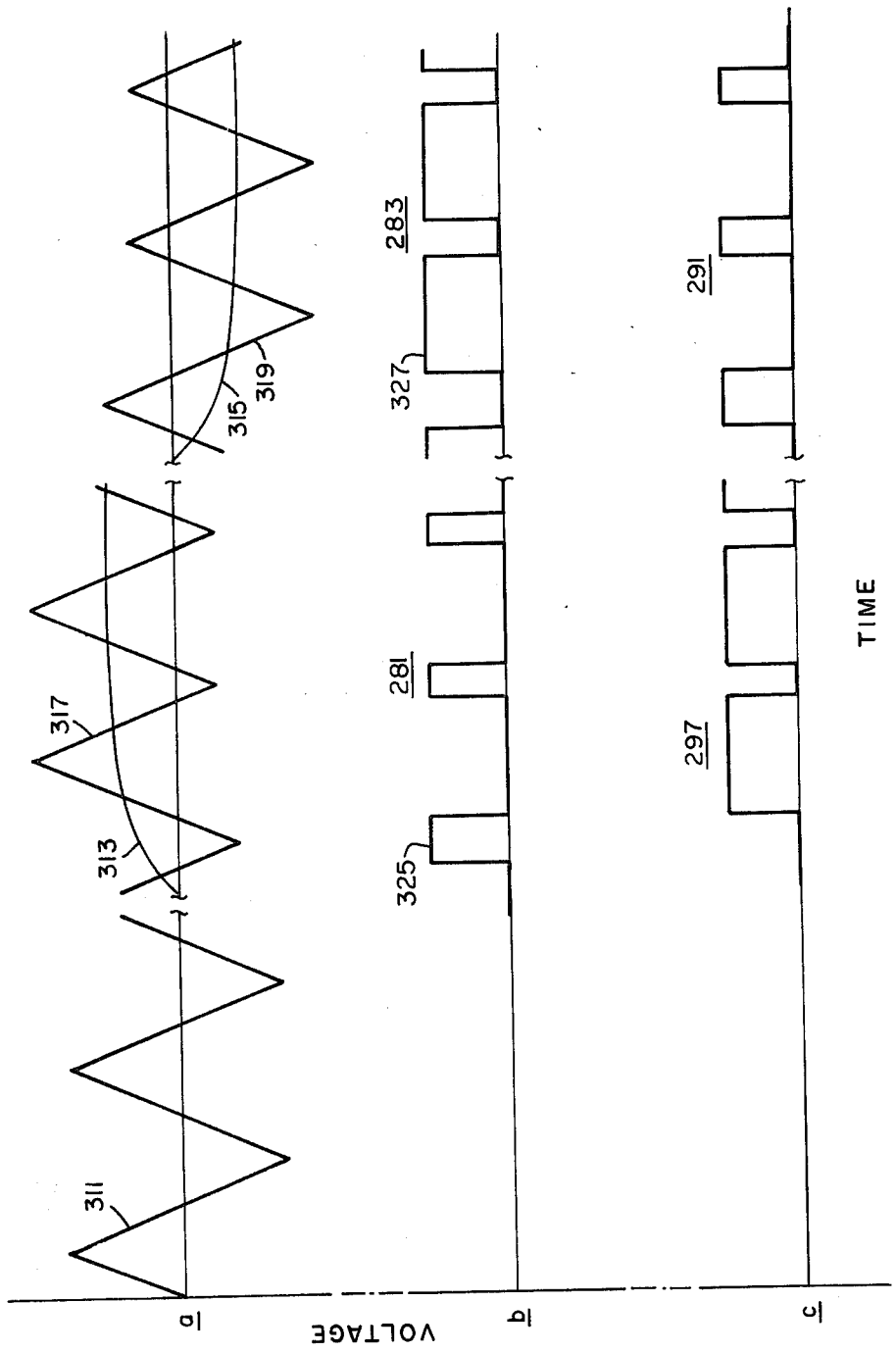
FIG. 3 is comprised of graphs a, b, c which show the operation of the multiplying apparatus shown in FIGS. 2A and 2B.

The operation of the multipliers including bridges 235 and 237 is illustrated graphically in FIG. 3. In each graph a, b, c of FIG. 3 the amplitude of the voltage impressed by amplifiers 245 and 247 or by micrologic 291, 295, 297 and 299 is plotted vertically and time horizontally. Points along the time axes of graphs 3a, b and c aligned vertically are assumed to occur at the same respective instants. Curve 311 represents a fragmental section of the triangular waveform voltage derived from a sawtooth genertor 150. Curve 313 represents a fragmental section of the positive signal waves derived from amplifiers 255 and 257 and curve 315 represents a like fragmental section of the negative signal waves. The effect of combining waves 311 and 313 is to raise the triangular waves above the time axis as represented by curve 317; the negative signals 315 likewise drop the waves 311 below the time axis as represented by curves 319. Because the frequency of the signal is low compared to that of the triangular waves, the signal may be regarded essentially as a direct current pulse. It is emphasized that the signal waves in raising or lowering the triangular waves above or below the time axis cause the waves to cut the time axis for a duration dependent on the extent to which the triangular waves are raised or lowered; that is, to the magnitude of the signal waves. The effect of amplifiers 281 and 283 is to invert and square-up that part of the input signal which lies below zero volts so that the outputs are represented, by curves 325 and 327. The micrologics 291 and 295 and 297 and 299 further square-up the waves impressed on the terminals 267 and 269 of the bridges 235 and 237. The durations of the waves to which curves 325 and 327 correspond depends on the amplitudes of the signals I4 and Q4 and these are multiplied by operation of the bridges 235 and 237 by Q3 and I3 respectively.

The multiplier outputs are subtracted by subtractor 331 (FIG. 1, 2B) and the result is to unfold the clutter and intruder signal spectra. The response of this apparatus is a direct-voltage proportional to doppler shift, which changes polarity with a change in the direction of the doppler shift. The clutter doppler sidebands which arise from phase modulation of the carrier however produce no direct output, but rather an alternating output at the modulation doppler frequency. This alternating output is large compared to typical intruder signal although the duration of the intruder signal is large compared to the period of the alternating clutter typically produced by wind moving growth back and forth. The clutter may therefore be rejected by filtering. This separation is accomplished electronically with a low-pass filter 333 having a high frequency cut-off. Typically the low-pass filter 333 has four poles and a high frequency cut-off at 0.04 cycles per second (0.04 Hz). The low-pass filter 333 supplies the incoming and outgoing threshold detectors 335 and 337 whose outputs are the desired alarms.

The subtractor 331 (FIG. 2B) includes a high-gain operational amplifier 341 which operates as a substractor by adding impressed and inverted signals. Terminals 269 of bridges 235 and 237 are connected through conductors 268 and 272 to the negative input of amplifier 341. Terminals 267 of the bridges are connected through resistor 343 to the output of amplifier 341. Negative feedback is impressed through resistor 345. This amplifier 341 operates to subtract the products I3Q4 and I4Q3.

Let U1 = voltage on line 268
L1 = voltage on line 272
U2 = voltage on line 270
L2 = voltage on line 274.
The product signal for bridge 235 is then U2−U1 and for bridge 237 L2−L1.

The effect of the amplifier 341 is to subtract U1−L1 from U2−L2. The result is:
U1−L1 − U2+L2
(U1−U2) − (L1−L2).

The filter 333 includes the capacitor-resistor network 351, 353, 355 and 357. Networks 351 and 353 are connected between the outputs and negative input of a high-gain operational amplifier 359 and networks 355 and 357 between the output and negative input of a like amplifier 361. The out of amplifiers 359 is connected to the negative input of amplifier 361 through resistor 363.

The threshold detectors 335 and 337 include a high-gain operational amplifier 365 having an input network 367, capable of responding to signals of opposite polarity above the threshold magnitude, connected between its negative and positive inputs. This network 367 includes resistors 369 and 371 shunted by diodes 373 and 375 grounded at their junction. Positive and negative bias respectively is connected through resistors 377 and 379 on the negative and positive inputs so that only negative signals overcoming the bias are impressed on the negative input and positive signals overcoming the bias on the positive input. The output is positive going and is impressed in the alarm 381 through diode 383 which suppresses negative going signals.

The direction of movement of the intruder is indicated on IN or OUT indicators 385 or 387 by operation of network 389 including transistors 391 and 393. The network 389 is connected so that with a positive signal in the output of amplifier 361, transistor 391 conducts and transistor 393 is maintained nonconducting by current flow through resistor 395. If a positive signal then appears on the output of amplifier 361, transistor 391 remains conducting and transistor 393 nonconducting and an out signal indication flows from the output of amplifier 265 to OUT indicator 387 through resistor 397. If a negative signal appears on the output of amplifier 361, transistor 391 becomes nonconducting and transistor 393 conducts and current flows through IN indicator 385 through resistor 399.

Figure 8A:
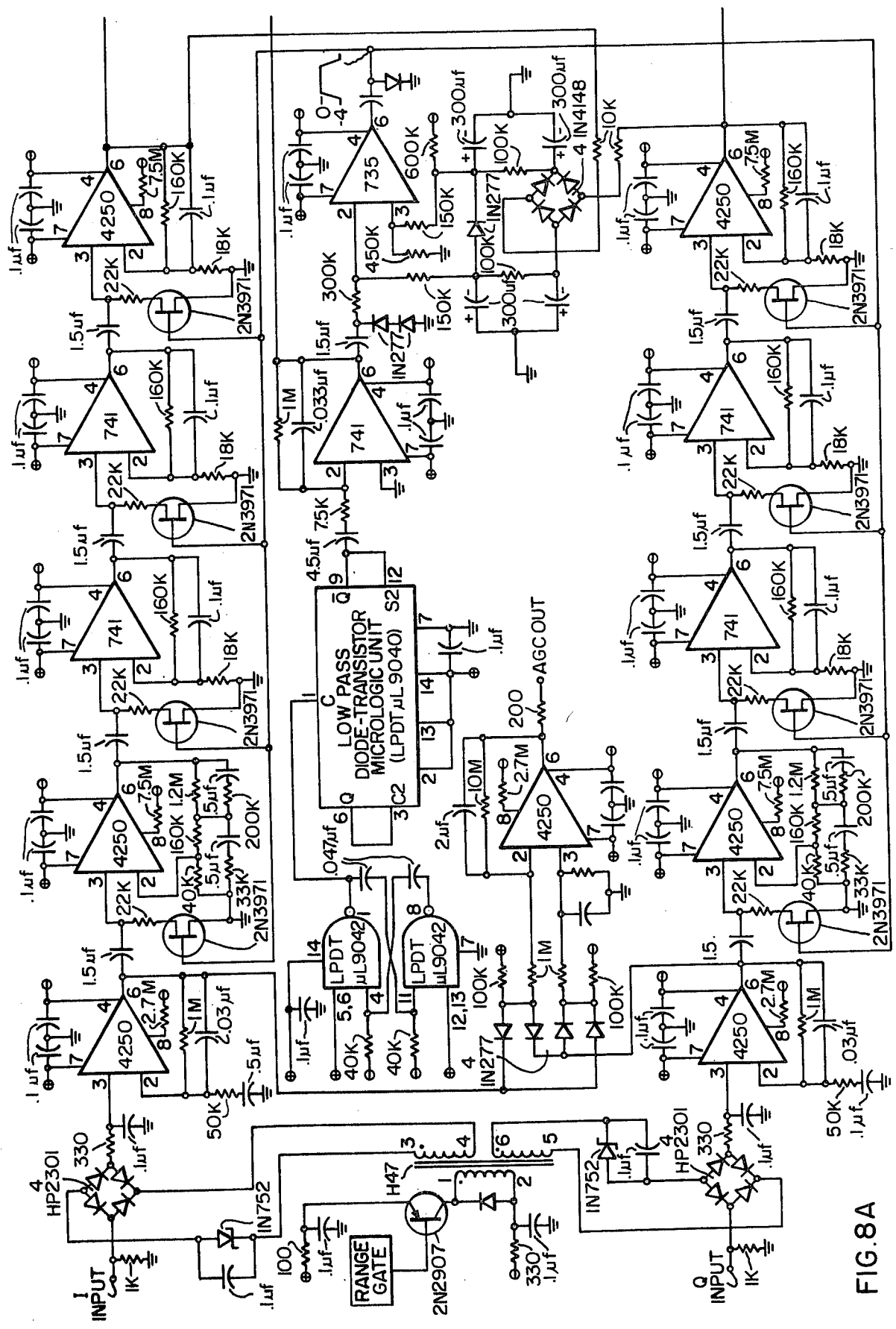
FIGS. 8A and 8B together constitute a schematic of apparatus as shown in FIGS. 2A and 2B but including the magnitudes of the components included in actual apparatus as shown in FIGS. 2A and 2B.
Figure 8:
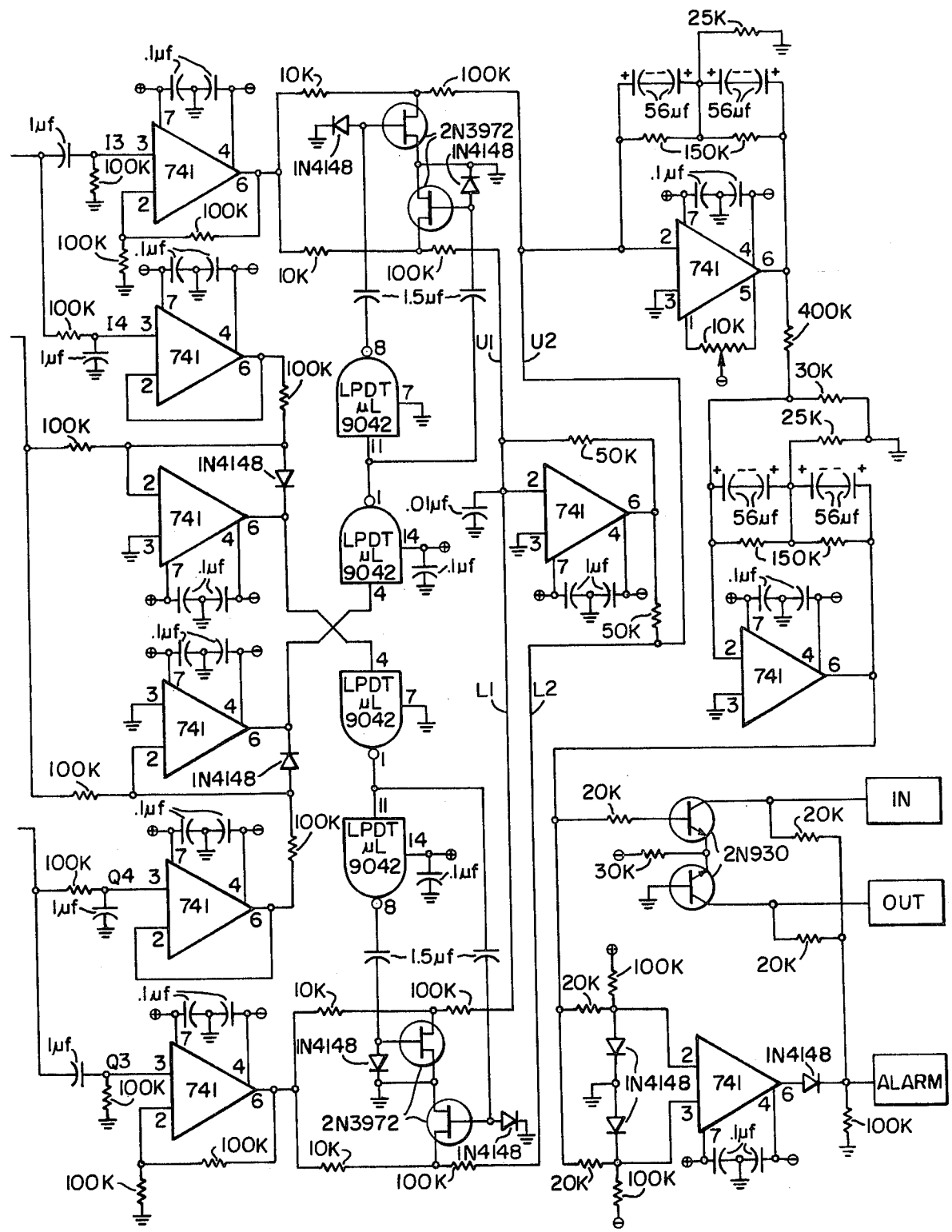

The symbols used in FIGS. 8A and 8B are on the whole conventional. Diodes are shown with the arrow in the direction in which positive current flows; that is, the arrow is the anode and the bar, the cathode. The micrologic such as 155 and 157, 291 and 295, and 297 and 299 are constructed as integrated units with the pin numbers as indicated on FIGS. 8A and 8B. The voltages on the high-gain amplifiers such as 57, 135, etc. is about plus 6 volts on pin 7 and minus 6 volts on pin 4. The capacities to ground of the voltage-supply by-pass capacitors is about 0.1 microfarads. In each operational amplifier the pin numbered 2 called herein the negative input producing an inverted output at the pin 6; the pin numbered 3 is called a positive input producing a noninverted signal at 6.

Figure 4:
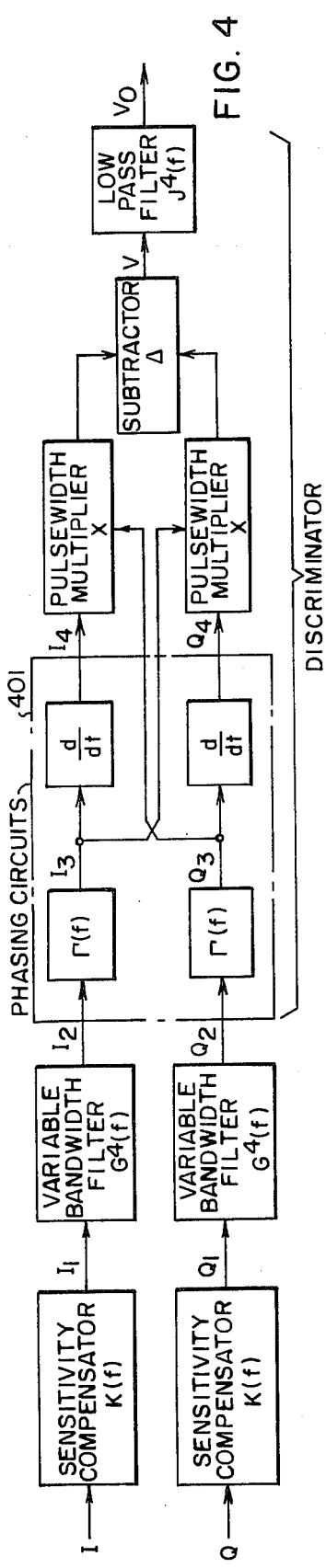
FIG. 4 is a block diagram showing the cooperative functions of the components of the apparatus shown in FIG. 1.

The operation of the apparatus disclosed will now be described with reference to FIG. 4 which shows by labelled blocks the sequential steps which constitute this overall operation.

The actual phasing circuits are represented by the mathematical functions within the broken-line block 401. The first derivative of a sinusoidal function is in quadrature with the function. The incoming I and Q signals are assumed to have the form $$I = A \sin \theta$$

$$Q = B \cos \theta$$

The actual complex signal is, of course, a polynomial of many such terms, however, the principle of operation and the quantitative results to be expected for specific conditions can be obtained to a good approximation with this simple representation. Initially matched channels can be assumed, the effect of mismatched channels can be determined later.

The steady state frequency compensation characteristic produced by the sensitivity or frequency compensation network 117 is given by $$K(f) = \frac{1 + (f/f_c)^2}{\sqrt{1 + (f/f_1)^2} \; \sqrt{1 + (f/f_2)^2}}$$

where typically $$f_1 = 0.27 \text{ Hz}$$

$$f_c = 1.6 \text{ Hz}$$

$$f_2 = 9.5 \text{ Hz}$$

where $f$ is an arbitrary input doppler frequency, $f_c$ is the center frequency of the passband of networks 225/227 and $f_1$ is the low frequency and $f_2$ the high frequency end of this pass band. The steady-state phase angle of K($f$) may be represented as $\phi(f)$ so that the I and Q signals emerging from the compensator become $$I_1 = A \, K(f) \sin (\theta + \phi(f))$$

$$Q_1 = B K(f) \cos (\theta + \phi(f))$$

These signals now pass through the variable bandwidth filter, assumed to have four stages, which has the steady-state response $$G^4(f) = \frac{1000}{(1 + (\frac{f_3}{f})^2)^2 (1 + (\frac{f}{f_4})^2)^2}$$

where typically $f_3$ 0.25 Hz (variable)

$f_4 = 10$ Hz (fixed)

where $f_3$ is the low frequency and $f_4$ the high frequency end of the pass band. The steady state phase angle of $G^4(f)$ is represented by $\phi_1(f)$, and the new I and Q signals become $$I_2 = A K(f) G^4(f) \sin (\theta + \phi(f) + \phi_1(f))$$

$$Q_2 = B K(f) G^4(f) \cos (\theta + \phi(f) + \phi_1(f))$$

The $I_2$ and $Q_2$ signals now pass through the first step of the phasing system which has the response $$\Gamma(f) = \frac{1}{\sqrt{1 + (\frac{f}{f_c})^2}}$$

and a phase angle $\phi_2(f)$. After this operation the $I_2$ and $Q_2$ signals become, $$I_3 = A K(f) G^4(f) \Gamma (f) \sin [\theta + \phi(f) + \phi_1(f) + \phi_2(f)]$$

$$Q_3 = B K (f) G^4(f) \Gamma (f) \cos [\theta + \phi(f) + \phi_1(f) + \phi_2(f)]$$

The next operation to be performed is the differentiation of $I_3$ and $Q_3$. For steady state conditions the coefficients $K(f)$, $G(f)$, and $\Gamma (f)$ are constants. Also, for steady state conditions the arguments $\phi(f)$, $\phi_1(f)$ and $\phi_2(f)$ are constants. The results of differentiation therefore are $$I_4 = A K(f) G^4(f) \Gamma (f) \frac{1}{E} \frac{d\theta}{dt} \cos [\theta + \phi(f) + \phi_1(f) + \phi_2(f)]$$

$$Q_4 = -B K(f) G^4(f) \Gamma (f) \frac{1}{E} \frac{d\theta}{dt} \sin [\theta + \phi(f) + \phi_1(f) + \phi_2(f)]$$

where E is a scale factor matching the gain of the model to the real circuit, $$E = 2 \pi f_c$$

The signals $Q_3$ and $I_4$ are now applied to the upper multiplier 231, 233 with the result $$I_4 Q_3 =$$

$$A B K^2(f) G^8(f) \Gamma^2(f) \frac{M}{E} \frac{d\theta}{dt} \cos^2 [\theta + \phi(f) + \phi_1(f) + \phi_2(f)]$$

and the signals $Q_4$ and $I_3$ are applied to the lower multiplier with the result $$I_3 Q_4 =$$

-continued
$$-A B K^2(f) G^8(f) \Gamma^2(f) \frac{M}{E} \frac{d\theta}{dt} \sin^2 [\theta + \phi(f) + \phi_1(f) + \phi_2(f)]$$

where $M = 1/16$. The factor M introduces the scale factor of the multiplier. When the multiplier outputs are subtracted the result is $$V = I_4 Q_3 - I_3 Q_4 = A B K^2(f) G^8(f) \Gamma^2(f) M \frac{d\theta}{dt}$$

Finally the subtracted output V is modified by the low pass filter 333 assumed to have four poles.

$$V_o = V \frac{300}{(1 + (f/f_o)^2)^2}$$

where typically $f_o = 0.04$ Hz, being the high-frequency end of its pass band.

The expression for V will allow the basic operation to be visualized in some detail. If, for example, a steady state doppler signal is applied to the processor inputs the original expressions for the I and Q input signals become, $$I = A \sin (\omega_d t + \phi)$$

$$Q = B \cos (\omega_d t + \phi)$$

It follows, therefore that $d\theta/dt$ is a constant equal to $\omega_d$. Thus, the previously defined functions $K(f)$, $G(f)$, and $\Gamma (f)$ may be evaluated as a function of $\omega_d$ and the significant processor response characteristics may be plotted. The graph is shown in FIG. 5 in which output is plotted vertically as a fraction of one and frequency horizontally on a logarithmic scale.

Figure 5:
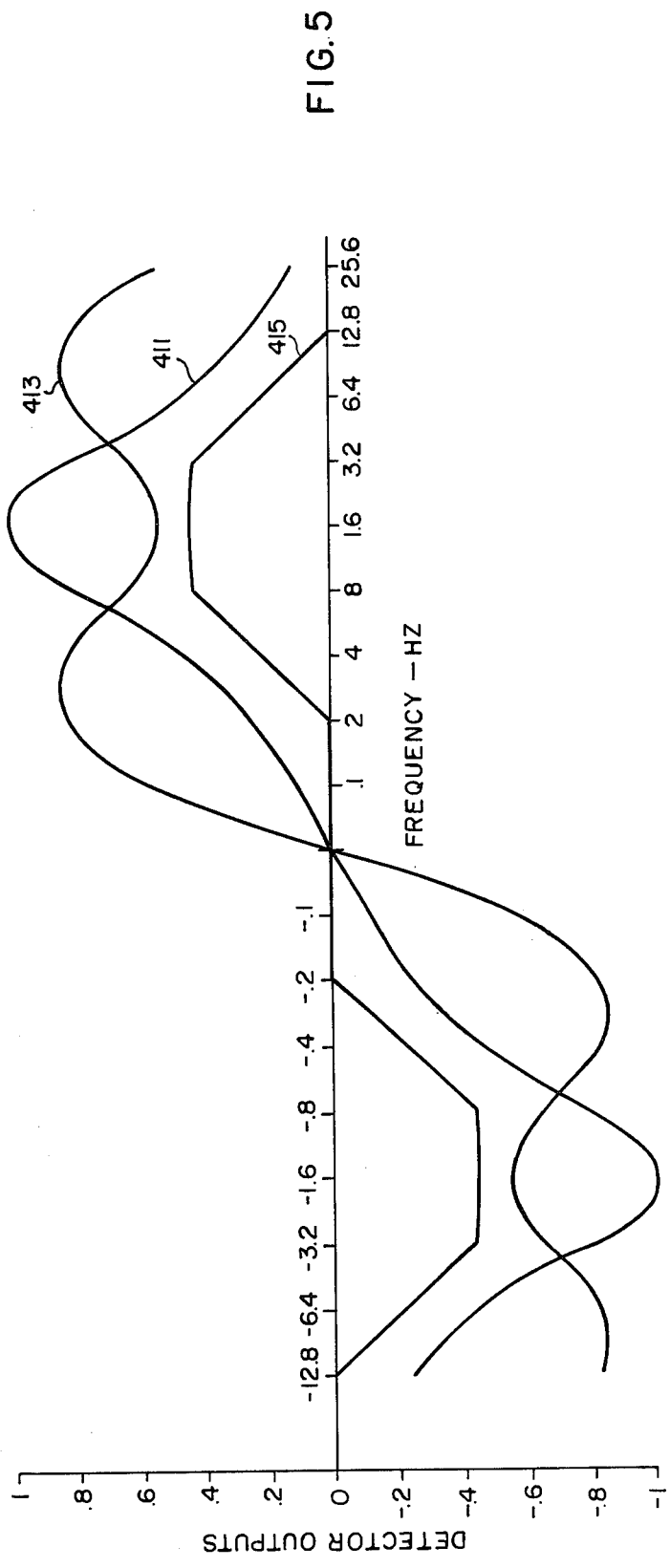
FIG. 5 is a graph illustrating the operation of the apparatus shown in FIG. 1.

Curve 411 of FIG. 5 shows the discriminator characteristic of the multiplier detector (labelled in FIG. 4) with unfolded doppler sidebands. The curve is somewhat distorted by the linear-log horizontal scale. Curve 413 of FIG. 5 shows the corrected multiplier-detector characteristic. This curve shows a response which is flat with ± 2 dB from 0.15 Hz to 15 Hz. The overall processor characteristic is shown by Curve 415. This curve shows a flat topped response with a fixed high frequency cut-off at 6.4 HZ and, for a particular case, a low frequency cut-off at 0.4 Hz. The apparatus can, of course, have other high-frequency cut-off and can adjust its low frequency cut-off in either direction.

The performance in the presence of clutter is more complex and cannot be reasonably determined for the apparatus as a whole. If a simple phase modulated model is analyzed for $I_c$ and $Q_c$ the clutter signals, then $$I_c = \sin (\Delta\theta \sin pt + \phi)$$

$$Q_c = B \cos (\Delta\theta \sin pt + \phi)$$

and $$d\theta/dt = \Delta\theta p \cos pt$$

$\Delta\theta$ is the amplitude of the swaying of the growth in the wind and $p$ the frequency of this swaying. Since the frequency is now time varying, steady state calculations would require a Fourier analysis of the $I_c$ and $Q_c$ signals so that the functions $K(f)$, $G(f)$ and $\Gamma(f)$ could be evaluated for each spectral component. In a practical case the input sinusoids are distorted having frequency components at $p$, $2p$, $3p$, etc. and the high-pass filter greatly accentuates the harmonics of $p$. The output from the apparatus under these conditions is a highly irregular wave with basic period $1/p$. The general expression for the contribution of the Nth harmonic is $$V_N = A_N B_N K^2(N_p) \; G^8(Np) \Gamma^2 (Np) \frac{M}{E} \theta \; Np \cos Npt$$

and one sees that, if M is constant, no component of the phase modulated wave produces a dc term at the output.

Several general conclusions may be reached based on the preceding analysis:

1. A steady doppler signal within the passband of the apparatus produces a constant output voltage whose polarity reflects the direction of the doppler shift.

2. Amplitude unbalance of the I and Q channels 111 and 113 cannot cause a steady output voltage or false doppler response. This follows from the expression for $V_N$ which shows the output to depend on the product of the gains and sinusoidal components in the case of non-doppler shifted signals.

3. Amplitude unbalance of the two multipliers 231 and 233 cannot cause a steady output voltage or false doppler response. In fact, it can be shown that the second multiplier only provides a small improvement in performance. If gain mismatched multipliers had been assumed in the analysis, the expression for V would have been $$V = ABK_A(f) \; K_B(f) \; G_A^4(f) \; G_B^4(f) \; \Gamma_A(f) \; \Gamma_B(f) \frac{d\theta}{dt} [M_A \cos^2\theta + M_B \sin^2\theta]$$

and for a sinusoidally phase modulated clutter component having a frequency p, this reduces to $$V = \frac{ABF(p)\Delta\theta \cos pt}{2E} \left[ (M_A + M_B) + (M_A - M_B)[(J_o(2\Delta\theta) + 2 \sum_{N=1}^{\infty} J_{2N}(2 \theta) \cos 2Npt)] \right]$$

That there is a benefit to be derived from the second multiplier can be determined by calculating the fundamental clutter component (at frequency $p$) and the signal levels with one multiplier only ($M_B = 0$) and then with two multipliers ($M_B = M_A$). The clutter levels are:

$$M_B = 0$$
$$V_c = \frac{A \; B \; F(p)\Delta\theta \; p \; M_A}{2E} [(1 + J_o(2\Delta\theta) + J_2(2\Delta\theta))] \cos pt$$

$$M_B = M_A$$
$$V_c = \frac{A \; B \; F(p)\Delta\theta p \; M_A}{2E} [2 \cos pt]$$

and the two signal levels are $$M_B = 0$$
$$V_s = \frac{A \; B \; F(f_d) M_A}{2E} f_d \left[ \frac{1}{2} + \frac{1}{2} \cos 2 f_d t \right]$$

$$M_B = M_A$$
$$V_s = \frac{A \; B \; F(f_d) M_A}{2E} f_d$$

For small phase excursions, i.e., swaying of the growth, $J_o(2 \theta) + J_2(2 \theta) = 1$ so that the apparatus response to the clutter is virtually unchanged when the second multiplier is added. However the second multiplier doubles the average value of the signal response. The major benefit of the processing technique is the inversion of the clutter and signal spectra wherein the doppler signal is always a nearly dc signal which may be separated from the clutter by means of a low-pass filter (333). The benefit derived from the second multiplier is a fringe benefit to be used only when maximum performance is required. Multiplier unbalance, of course, is not a cause of phase doppler response. Apparatus in accordance with this invention including only one multiplier 231 or 233 (FIG. 1) would produce at the output of the multiplier the product I3Q4 or I4Q3 and would not include a subtractor 331 but would include the other components. 4. Phase unbalance of the two processor channels cannot cause a steady output voltage or false doppler signal. If a phase mismatch or the processor channels had been assumed in the analysis the expression for V would have been $$V = \frac{ABK^2 (f) \; \Gamma^2 (f) G^8 (f) M \frac{d\theta}{dt}}{E} \left[ (\sin(\theta - \frac{\delta}{2})\sin(\theta + \frac{\delta}{2}) + \cos(\theta - \frac{\delta}{2})\cos(\theta + \frac{\delta}{2}) \right]$$

where δ is the phase unbalance. The equation for V reduces to $$V = \frac{ABK^2(f)G^8(f) \; \Gamma^2 (f) M \Delta\theta p \cos pt}{E} \cos \delta$$

Phase unbalance therefore does not produce a false doppler response in the presence of clutter but does render the processor completely insensitive to doppler signals when δ = 90°. Complete rejection of common mode input signals also has been noted experimentally.

5. Referring to the expression for $V_N$, it is seen that if the multiplier or any amplifying device ahead of the multiplier introduces asymmetrical amplitude distortion there will be a false doppler response to non-doppler signals, a fact which has been experimentally noted. Multiplier offsets will, of course, produce a false doppler response.

In contrast to the above characteristics, the balanced processor of the prior art requires very close amplitude and phase balance of many stages. This includes the variable bandwidth filters, a pair of gain control stages, and a pair of envelope detectors. In addition the single sideband network must be precise and the requirement for linearity generally appears to be the same.

The multiplier processor according to this invention, also appears to be less complex. The integrated circuit count for the complete multiplier processor is 27. In a two-channel balanced processor of the prior art, the integrated circuit count is 27 when the variable bandwidth filters, the single sideband filter, and the variable gain amplifiers are excluded. Finally, precision passive components are limited to the phase difference and multiplier circuits in the multiplier processor whereas the balanced processor requires precise components throughout the system to preserve phase and amplitude balance.

Performance of the multiplier processor was evaluated using simulated doppler and clutter signals. The signal simulator provided good simulation of all conditions, however the simulation of clutter was of necessity limited to a very specific condition. Because of this limitation a worst case condition was selected.

The signals were simulated by means of a two phase resolver which was motor (not shown) driven through reduction gears. The resolver rotor was excited by a steady current so that the outputs were a sine wave and cosine wave. A reversal in direction changes the phase rotation as required to simulate both incoming and outgoing targets. The sine and cosine outputs are applied to operational integrators which remove the dependency of the rms voltage on rotational speed.

The first method used to simulate clutter used a second resolver (not shown) which was rocked back and forth by means of a crank which also was motor driven through reduction gears. The rotor was excited by an 800 Hz sine wave and the outputs were phase detected using the same 800 Hz sine wave as a reference. This simulated a system having separate transmit and receive antennae facing each other but with one moving back and forth with respect to the other. The resulting I and Q "clutter" signals were summed with the corresponding signals from the integrators.

A second method used to simulate the clutter was less sophisticated requiring only a pair of audio oscillators. The specific conditions being simulated were $$I = K \sin(\pi/2 - \pi/2 \sin pt)$$

$$Q = k \cos(\pi/2 - \pi/2 \sin pt)$$

Figure 6:
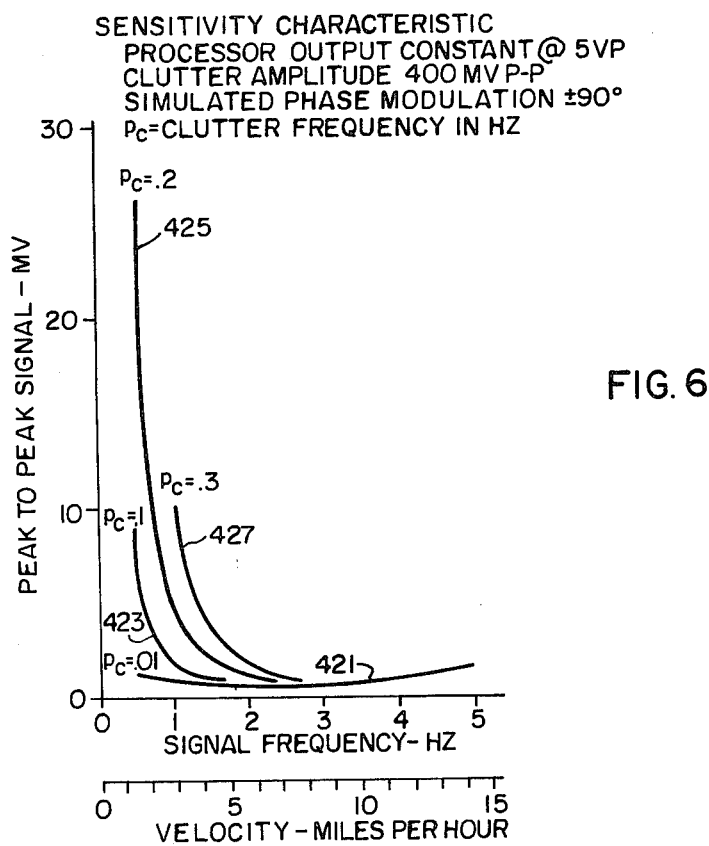
FIG. 6 is a graph showing the sensitivity characteristic of the apparatus shown in FIG. 1, derived with simulated signals.
Figure 7:
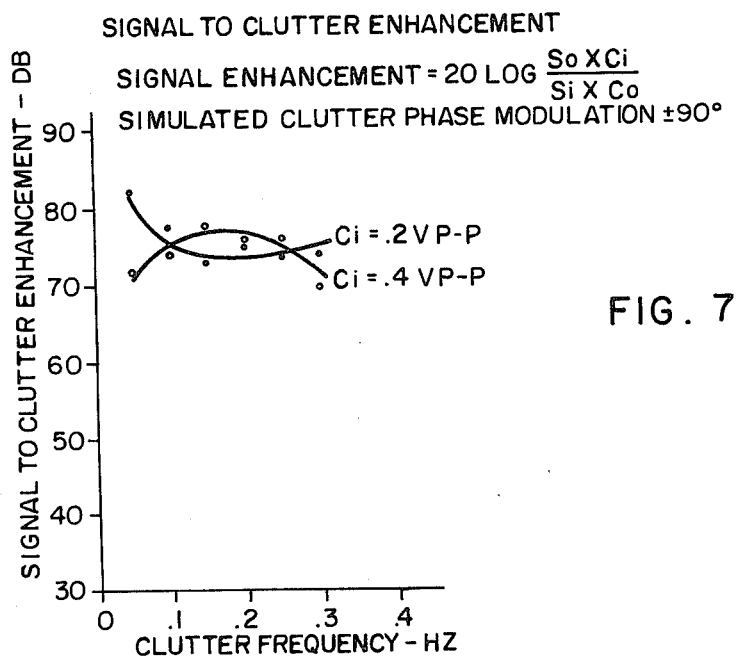
FIG. 7 is a graph showing the signal-to-clutter enhancement which is achieved with the apparatus shown in FIG. 1.

Note that I describes a rectified cosine wave having a peak-to-peak amplitude $k$ and a frequency $2p$, and that Q describes a sine wave having a peak-to-peak amplitude $2k$. Accordingly, the I channel oscillator was set to twice the frequency of the Q channel oscillator but to half the amplitude. The frequency of the Q channel oscillator was considered to be the "sway" frequency. The two methods of simulation gave similar results. FIGS. 6 and 7 show the results achieved with the second method but with an incomplete processor. The processor contained neither a sample and hold circuit nor a low-noise amplifier stage so that both the signal and clutter levels are higher than those implied by the design constants presented in the analysis.

FIG. 6 shows the effect of clutter level on detectability of signals. The curves 421, 423, 425, 427 show the input level required to maintain a fixed output level over a doppler band from 0.5 to 5 Hz. The magnitude of the signal required is plotted vertically in millivolts and signal frequency and equivalent miles per hour of detector object horizontally. The curves 421 through 427 were plotted for four different "sway" frequencies tat a constant clutter amplitude of 400 MV peak to peak. When the clutter sway frequency was very low ($p_c = 0.01$) the processor demonstrated full sensitivity to below 0.5 Hz (curve 421) while with a high clutter frequency ($p_c = 0.3$) the sensitivity was severly reduced below about 2 Hz as was expected (curve 427).

FIG. 7 shows the signal to clutter enhancement provided by the processor as a function of clutter frequency. Enhancement in DB is plotted vertically and clutter frequency horizontally. In the equation for signal enhancement at the top of FIG. 7

$Si$ = input signal
$So$ = output signal derived at output of the amplifier 361
$Ci$ = input clutter
$Co$ = output clutter The doppler frequency used to determine the enhancement was optimum (approximately 3 Hz). Note that this enhancement is dependent on the specific test conditions. The results, for example, when derived with a signal to clutter ratio of $-12$ dB at the input to the multipliers. Were the gains adjusted so that the signal to clutter ratio at the multiplier inputs were 0 dB the enhancement would have been greater but no useful benefit would result as the signal is already sufficiently greater than the clutter at the output to insure detection without false alarms. No allowance in the calculations was made for the central clutter spike in the clutter spectrum, a fact which will make the results pessimistic under still air conditions where the central spike energy is maximum. While the tests demonstrate the ability to cope with sway conditions, evaluation with real clutter is needed to verify the overall processor characteristics.

While a preferred embodiment has been disclosed herein many modifications thereof are feasible. This invention is not to be restricted except insofar as is necessitated by the spirit of the prior art.

We claim as our invention:

1. The method of suppressing clutter in the operation of a moving-target radar, said clutter being produced by an object which moves backward and forward about a fixed position, the received signal of said radar being converted into quadrature signals, herein called an I signal and a Q signal, the said method comprising, converting the I signal into quadrature signals, herein called I3 and I4 signals, I3 lagging I4 by 90°, converting the Q signal into quadrature signals, herein called Q3 and Q4, Q3 lagging Q4 by 90°, deriving at least one of the products I3Q4 or I4Q3 and producing responsive to said product an indication of the target and the direction of movement of the target while suppressing the clutter.

2. Moving-target radar apparatus for detecting a target moving in a region in which clutter is at the same time produced by an object in said region moving backward and forward about a fixed position, the said apparatus comprising means for transmitting a beam of high-frequency energy into said region, said beam producing a resulting reflected beam by reflection from said target and object, means for receiving said reflected beam and deriving therefrom a signal of doppler frequency corresponding to the movement of said object and clutter, first converting means connected to said receiving means for converting said signal and clutter into substantially quadrature signals, herein called an I signal and a Q signal, second converting means connected to said first converting means for converting said I signal into substantially quadrature signals, herein called I3 and I4 signals, I3 lagging I4 by about 90°, third converting means connected to said first converting means for converting said Q signal into substantially quadrature signals, herein called Q3 and Q4 signals, Q3 lagging Q4 by about 90°, multiplying means connected to said second and third converting means for deriving from said last-named means at least one product signal I3Q4 or I4Q3, and means connected to said multiplying means for indicating the movement of said object and its direction of movement.

3. The apparatus of claim 2 including filter means having a predetermined pass band corresponding to the doppler frequencies interposed between the first converting means and the second and third converting means for limiting the frequency of the signals passed to said second and third converting means.

4. The apparatus of claim 3 including means responsive to the magnitude of the clutter for stabilizing the pass band of the filter means as the clutter at the output of the filter means varies about a predetermined magnitude.

5. The apparatus of claim 4 including pass band means which stabilizes the pass band only at the low frequency end of the band as the clutter at the output of the filter means varies about the predetermined magnitude.

6. The apparatus of claim 2 wherein the deriving means includes frequency-compensation means for stabilizing the frequencies of the I and Q signals.

7. The apparatus of claim 2 including low-pass output filter means interposed between the multiplying means and the indicating means.

8. The apparatus of claim 2 wherein the indicating means includes low-pass output filter means.

9. The method of claim 1 including the steps of deriving both products I3Q4 and I4Q3, deriving the difference between the products I3Q4 and I4Q3 and producing the indication responsive to the said difference.

10. The apparatus of claim 2 including multiplying means for deriving both products I3Q4 and I4Q3 and also including computer means for deriving the difference between I3Q4 and I4Q3, the indicating means being converted to, and responsive to the difference computed by, the computer means.

11. The apparatus of claim 4 wherein the filter is a variable filter and includes capacitance means and resistance means, herein called impedance means, and also includes means connecting said capacitance means and said resistance means in a filtering network, the said connecting means including switching means for varying the time during which at least one said impedance means is connected in said network thereby varying said filter.

12. The apparatus of claim 2 wherein the multiplying means includes a balanced network having first and second conjugate terminals and third and fourth conjugate terminals, first circuit means connected to said first and second terminals for impressing a first electrical parameter corresponding to the magnitude I3 or I4, as the case may be, to said first and second terminals so as to unbalance said network in proportion to the said magnitude, second circuit means connected to said third and fourth terminals for impressing a second electrical parameter corresponding to the magnitude of Q4 or Q3 respectively, as the case may be on said third and fourth terminals so as to weight said unbalance in proportion to said magnitude of Q4 or Q3 respectively, as the case may be, and means connected to said balanced network for deriving the third parameter produced as a result of the weighted unbalance of said network.

* * * * *